United States Patent Office 3,345,348
Patented Oct. 3, 1967

3,345,348
SULFUR TETRAFLUORIDE TREATED ELASTOMERS HAVING A LOW COEFFICIENT OF FRICTION
Gerald J. Tennenhouse, Royal Oak, Mich., assignor to General Motors Corporation, Detroit, Mich., a corporation of Delaware
No Drawing. Filed June 3, 1964, Ser. No. 372,403
7 Claims. (Cl. 260—83.3)

ABSTRACT OF THE DISCLOSURE

An elastomer having a greatly reduced coefficient of friction made by subjecting the surface of a conventionally made elastomer such as natural rubber, butydiene-styrene copolymers, butydiene-acrylonitrile copolymers and polychloroprene to sulfur tetrafluoride in a temperature range of about −30° C. to the degradation temperature of the elastomer.

---

This invention relates to natural and synthetic resin elastomers having a low coefficient of friction and to a process for modifying the surface of elastomers whereby the coefficient of friction of their surfaces is greatly reduced.

As is well known, various natural and synthetic elastomers such as natural rubber, butadiene-styrene copolymers, butadiene-acrylonitrile copolymers and chloroprene and the like are valued highly in a variety of applications because of their properties of high elasticity and high coefficient of friction.

In some applications, as for example inner tubes, rubber bands, balloons, the rubber is used for its high elasticity. In other applications, as for example rubber tires, floor treads, the rubber is used both for its elasticity and high coefficient of friction. In still other applications, however, the property of elasticity is highly important and the high frictional property is undesirable and is merely tolerated to take advantage of the elastic property of the rubber. Applications falling in the latter category include fluid seals in which the seal serves a wiping function against a relatively movable part, door weather stripping, etc. In this category of applications, the high frictional properties of the rubber may be greatly disadvantageous since it results in a high wear rate of the article and accordingly a relatively short life.

It is accordingly the basic object of this invention to provide a rubber product taken from the group consisting of natural rubber, butadiene-styrene copolymers, butadiene-acrylonitrile copolymers, polychloroprene and similar butadiene type rubbers having markedly reduced coefficient of friction. It is a further object of this invention to provide a process whereby the surface of the rubber article is directly treated and the surface structure thereof is modified whereby the coefficient of friction of the rubber surface is greatly reduced without altering the essential elastic properties of the rubber article.

These and other objects of the invention are carried out by subjecting an elastomer compound formed principally of butadiene type molecules and including primarily natural rubber, butadiene-styrene copolymers, butadiene-acrylonitrile copolymers, and polychloroprene to sulfur tetrafluoride at a temperature range of from about −30° C. to the degradation temperature of the rubber article (for a time range from about 15 minutes to about 24 hours). Other objects and advantages of the invention will be apparent from the following detailed description thereof.

It is known that polymeric materials which contain hydroxyl groups, such as cotton, wood and cellulose, may be treated with sulfur tetrafluoride to render the material less susceptible to swelling when in contact with water. Also in the past attempts have been made to reduce the coefficient of friction of elastomers such as natural rubber, butadiene-styrene copolymers, butadiene-acrylonitrile copolymers and polychloroprene by procedures which involve first altering the surface of the elastomer by grafting a polymeric material having reactive groups such as acrylates onto the rubber surface and then subjecting the grafted acrylic surface to sulfur tetrafluoride. This invention involves the surprising discovery that the coefficient of friction of elastomers of the butadiene type, which do not contain hydrogen reactive groups including natural rubber, butadiene-styrene copolymers and butadiene-acrylonitrile copolymers and polychloroprene, may have their surfaces suitably cleaned and directly subjected to sulfur tetrafluoride whereby the coefficient of friction of the treated elastomer surfaces are substantially reduced without significantly affecting the elasticity or other properties thereof.

In general, the process of this invention involves subjecting clean surfaces of an elastomer of the class comprising natural rubber, butadiene-styrene copolymers, butadiene acrylonitrile copolymers, and polychloroprene to sulfur tetrafluoride. If the elastomer surface is clean, no treatment preliminary to subjecting the surfaces to sulfur tetrafluoride is necessary. In general, suitably clean elastomer surfaces may be obtained by merely washing the elastomer surface with a hot aqueous detergent such as the commercial Tide detergent. In some instances, particularly where the elastomer contains significant quantities of a nitrile component, as in the case of butadiene-acrylonitrile copolymer, improved results are obtained when the elastomer surface is treated with a boiling aqueous potassium hydroxide solution. The elastomer surface is then washed with clean water and dried. The dry elastomer is then placed in a suitable reaction vessel such as one made of stainless steel and the reaction vessel is charged with sulfur tetrafluoride. A surface having a markedly reduced coefficient of friction is obtained within about 15 minutes to 24 hours while the elastomer is maintained at a temperature range from −30° C. to the degradation temperature of the elastomer. Preferably the sulfur tetrafluoride is employed in the form of the gas. Although the charging pressure may be low, in the neighborhood of atmospheric pressure, the reaction time is shortened by charging the reaction vessel with sulfur tetrafluoride under pressure in the neighborhood of about 30 pounds per square inch gauge. Although satisfactory results are obtained in employing the process at room temperatures and at sub-zero temperatures down to about −30° C., in some instances the reaction time may also be reduced by employing elevated temperatures up to the degradation temperature of the elastomer. Temperatures below −30° C. are not favored since the treatment tends to produce a brittle elastomer and, of course, temperatures within the elastomer degradation range are unsatisfactory because of the adverse effect on the elastomer. The following examples further illustrate the invention:

EXAMPLE I

Several cured elastomer samples having the dimensions of 1" x 1" x 1/16" were compounded and molded by standard techniques having the following composition:

| | Parts |
|---|---|
| Butadiene-acrylonitrile copolymer containing about 34% acrylonitrile | 100 |
| Zinc oxide | 5 |
| Stearic acid | 4 |
| Dicumene hydroperoxide | 4 |

A sample was first washed in a hot Tide detergent solution and then boiled for 10 minutes in a 30% potassium hydroxide solution, then boiled for 5 minutes in a concentrated hydrochloric acid solution, then rinsed and allowed to dry in air. The sample was then placed in a stainless steel reaction vessel. The vessel was evacuated to about 0.1 millimeter of mercury and dried in the vacuum for about 30 minutes. The evacuated vessel was then heated to 130° C. and charged with sulfur tetrafluoride to a pressure of 12 pounds per square inch above atmospheric pressure. The vessel was maintained at 130° C. for 17 hours. The vessel was then placed under vacuum for 30 minutes and allowed to cool. The sample was then removed from the vessel and washed with a 1 N sodium hydroxide solution, rinsed with water and allowed to dry. The resulting elastomer was brown in color and slippery to the touch.

The coefficient of friction of the sample was then compared with an untreated sample of the same material in the following manner: Each sample was attached to an Instron machine through a pulley, loaded with a 50 gram weight and pulled across a polished aluminum surface at a uniform rate of 5 inches per minute over a distance of 14 inches. The average force required to move the treated sample at the said uniform rate was 19 grams. In contrast, the average force required to move the untreated sample at the same uniform rate was 36 grams. The coefficients of friction relative to the aluminum surface were found to be .38 for the treated sample and .72 for the untreated sample.

EXAMPLE II

Another sample of the rubber stock described in the Example I above was washed in a hot detergent solution, air dried, and placed in a stainless steel reaction vessel. The vessel was placed under vacuum for 30 minutes and then heated to 125° C. The vessel was then charged with sulfur tetrafluoride to a pressure of 12 pounds per square inch gauge and maintained at 125° C. for 3 hours. The vessel was evacuated and allowed to cool. The sample was removed and first washed in 1 N potassium hydroxide and then rinsed in water and allowed to dry in air. The coefficients of friction of this treated sample and an untreated sample were compared using the same apparatus described in Example I. The average force needed to move the treated sample at the said uniform speed was found to be 16 grams. In contrast, the average force needed to move the untreated sample was 28 grams. The coefficient of friction relative to the aluminum surface was found to be .32 for the treated sample and .56 for the untreated sample. In general, it was found that while the coefficient of friction of samples varied from day to day using the above described procedure, the difference in the coefficient of friction between the treated and untreated samples remained substantially constant.

EXAMPLE III

Several cured samples of an elastomer were formed in the shape of a cylindrical seal 1 inch in diameter having the following composition:

| | Parts |
|---|---|
| Butadiene-acrylonitrile copolymer containing about 34% acrylonitrile | 95 |
| Butadiene-styrene copolymer containing about 23% styrene | 5 |
| Carbon black | 100 |
| Zinc oxide | 5 |
| Stearic acid | 1 |
| Sulfur | 0.2 |

Small amounts of various stabilizers and plasticizers.

The sample was washed in a hot detergent, boiled for 10 minutes in 30% potassium hydroxide, then boiled for 5 minutes in a solution of concentrated hydrochloric acid, rinsed and air dried, and placed in the stainless steel reaction vessel. The sample was then vacuum dried in the vessel for 30 minutes and heated at 120° C. The vessel was then charged with sulfur tetrafluoride to a pressure of 25 pounds per square inch gauge which was maintained at 120° C. for 16 hours. Thereafter the vessel was evacuated and cooled. The sample was removed, rinsed with 1 N potassium hydroxide water, and then air dried. The coefficient of friction of the treated sample was found to be .42 relative to the aluminum surface and the coefficient of friction of an untreated sample was found to be .70 relative to the aluminum surface.

EXAMPLE IV

A cured 2″ x 1″ x 1/16″ sample was prepared having the following composition:

| | Parts |
|---|---|
| Polychloroprene | 100 |
| N-phenyl B-naphthylamine | 2 |
| Stearic acid | 0.5 |
| Magnesium oxide | 2 |
| Carbon black | 50 |
| Zinc oxide | 5 |
| 2-mercaptoimidazoline | 1 |

The sample was washed in a hot detergent solution, rinsed, and air dried. The sample was then placed in the stainless steel reaction vessel and dried in vacuum for 30 minutes at room temperature. The evacuated vessel was then filled with sulfur tetrafluoride to a gauge pressure of 30 pounds per square inch and the sample was allowed to remain therein for 17 hours at a temperature of about 22° C. At the end of this period of time the gauge pressure had dropped to 22 pounds per square inch. The vessel was then placed under vacuum for 15 minutes and opened. The sample was washed in a 1 N potassium hydroxide solution, rinsed, and air dried. Using the technique described in Example I to measure the friction characteristics, the treated sample required an average force of 40 grams to pull the sample loaded with a 50 gram weight across the polished aluminum surface at a rate of 5 inches per minute. An untreated sample required an average force of 68 grams.

EXAMPLE V

Several samples identical to that of Example IV were prepared except that the carbon black was omitted.

The sample was treated as described in Example IV. The treated sample required an average force of 40 grams to pull the sample loaded with a 50 gram weight across the polished aluminum surface at a rate of 5 inches per minute, where as an untreated sample required 102 grams.

EXAMPLE VI

Cured samples were prepared of the size described in Example IV but having the following composition:

| | Parts |
|---|---|
| Butadiene-styrene copolymer containing about 23.5% styrene | 100 |
| Triethanolamine | 3 |
| Stearic acid | 1.5 |
| Zinc oxide | 3 |
| Carbon black | 50 |
| N-phenyl B-naphthylamine | 2 |
| Dioctyl phthalate | 3 |
| Benzothiazyl disulfide | 1.5 |
| Tetramethyl thiuram monosulfide | 1 |
| Sulfur | 0.5 |

One sample was treated as described in Example IV. The friction properties of a treated and an untreated sample were measured as described in Example I. The treated sample required a force of 28 grams, whereas the untreated, a force of 60 grams.

EXAMPLE VII

Several cured samples were prepared of the size described in Example IV having the composition of Example VI except that the carbon black and the dioctyl phthalate were omitted.

One sample was treated as described in Example IV and the friction properties of the treated sample and untreated sample of the same composition were measured as before. The force required for the treated sample was 21 grams and the untreated sample, 120 grams.

EXAMPLE VIII

Several cured elastomer samples were prepared of the size described in Example IV having the following composition:

| | Parts |
|---|---|
| Natural rubber | 100 |
| Stearic acid | 3 |
| Aldol-α-naphthylamine | 1 |
| Reogen high molecular weight oil soluble sulfonic acid | 2 |
| Pine tar | 1 |
| Carbon black | 63 |
| 2-mercaptobenzothiazole | 1 |
| Sulfur | 3 |

A sample was treated with sulfur tetrafluoride in the same manner as described in Example IV and coefficient of friction tests were made as previously described. The treated sample was found to require a force of 26 grams while the untreated sample of the same composition required 100 grams.

EXAMPLE IX

A sample of the size described in Example IV was prepared having the composition of Example VIII except that the carbon black, the pine tar, and the sulfonic acid were omitted.

A sample was treated as in Example IV and friction tests were made as previously described. The treated sample was found to require an average force of 22 grams whereas the untreated sample required 140 grams.

EXAMPLE X

Cured samples were prepared of an elastomer having the following composition:

| | Parts |
|---|---|
| Butadiene-acrylonitrile copolymer containing about 34% acrylonitrile | 100 |
| Zinc oxide | 2.5 |
| Sulfur | 1.5 |
| Tetramethyl thiuram disulfide | 0.2 |

A sample was treated as described in Example IV and coefficient of friction tests were made as previously described. A treated sample required an average pull of 34 grams, while the untreated sample required an average pull of 60 grams.

In general, it was observed that the coefficient of friction of the treated samples was reduced by about one-half or more by the process of this invention. Although it is apparent that the surface of the elastomer undergoes a change and probably a molecular change, the nature of this change is not definitely known since a chemical reaction between the elastomer surface molecules and the sulfur tetrafluoride is not to be expected by any known mechanism.

In general, the process of this invention is effective on virtually any elastomer of the butadiene type and no surface pretreatment is required except when the elastomer contains substantial amounts of an acrylonitrile component. Improved results, however, are obtained when the elastomer surfaces are clean. In general, to obtain such improved results it is only necessary to clean the elastomer surfaces with a hot detergent solution. In the event the elastomer contains substantial quantities of an acrylonitrile component, additional preparatory cleaning treatment with a caustic solution is beneficial. As the above examples show, further treating the samples with a caustic and an acid preliminary to the sulfur tetrafluoride has no appreciable effect. In general, it is desirable to rinse or wash the sample after the sulfur tetrafluoride treatment with a dilute potassium hydroxide solution to remove residual sulfur tetrafluoride, although this is not essential.

As previously stated, the process may be practiced successfully as low as —30° C. up to the degradation temperature of the elastomer. It is not desirable to practice the process in the vicinity of the degradation temperature thereof because of the adverse effects of the heat on the other physical properties of the elastomer. It will be appreciated, of course, that the temperature at which a substantial degradation of the elastomer occurs to affect its properties adversely will vary with the various elastomers. As a practical matter, no advantage is gained by practicing the process in excess of about 150° C. As previously indicated, satisfactory products having a markedly reduced coefficient of friction are obtained when the elastomer is subjected to gaseous sulfur tetrafluoride for about 15 minutes when elevated temperatures and pressures are used as previously described, although substantial reduction in the coefficient of friction is obtained in a few seconds of time. No significant advantage is obtained when the duration of the treatment exceeds about 24 hours.

The process of this invention is operative with both cured and uncured elastomers as well as filled and unfilled elastomers. In some instances it is desirable to treat uncured elastomers by means of the process of this invention while employing suitable temperatures to effect a simultaneous cure of the elastomer. In general, it is preferable to employ sulfur tetrafluoride in its gaseous state in the process, although it will be readily apparent to those skilled in the art that the sulfur tetrafluoride may be applied to the elastomer surface in a suitable solvent solution which would not have a solvent or other adverse effect on the elastomer.

While the invention has been described in terms of preferred embodiments, it is to be understood that the invention is not limited thereby except as defined by the following claims.

I claim:

1. The process which comprises directly contacting an elastomer taken from the class consisting of natural rubber, butadiene-styrene copolymers, butadiene-acrylonitrile copolymers and polychloroprene, with sulfur tetrafluoride, thereby substantially reducing the coefficient of friction of the elastomer surface without substantial change in the physical form thereof.

2. The process of claim 1 wherein the sulfur tetrafluoride is gaseous.

3. The elastomer prepared by the process of claim 1.

4. The process of reducing the coefficient of friction of the class of elastomers taken from the group consisting of natural rubber, butadiene-styrene copolymers, butadiene-acrylonitrile copolymers and polychloroprene, without previously altering the chemical structure of the elastomer surface to change the physical form thereof, which comprises contacting the elastomer surface with gaseous sulfur tetrafluoride under substantially anhydrous conditions at a temperature between about —30° C. and the degradation temperature of the elastomer.

5. The process of reducing the coefficient of friction of a butadiene-acrylonitrile elastomer without previously altering the chemical structure of the elastomer surface to change the physical form thereof, which comprises subjecting the elastomer surface to hot aqueous caustic solution, removing the caustic from said surface and drying the same, and subsequently contacting the elastomer surface with sulfur tetrafluoride under substantially anhydrous conditions at a temperature between −30° C. and the degradation temperature of the elastomer.

6. The process of claim 4 in which the elastomer is butadiene-acrylonitrile copolymer.

7. The process of claim 4 in which the elastomer is polychloroprene.

References Cited

UNITED STATES PATENTS 2,983,626  5/1961  Schneider.

JOSEPH L. SCHOFER, *Primary Examiner.*

H. WONG, JR., *Assistant Examiner.*